3,416,936
ABRASION RESISTANT GLASS BEAD WITH SHARP SOFTENING RANGE AND PROCESS FOR MAKING THE SAME
James D. Sproul, Jr., House Springs, Mo., assignor, by mesne assignments, to General Steel Industries, Inc., Granite City, Ill., a corporation of Delaware
No Drawing. Filed Mar. 1, 1965, Ser. No. 436,296
7 Claims. (Cl. 106—52)

ABSTRACT OF THE DISCLOSURE

A glass bead having a high melting point and a relatively sharp softening range and a high degree of abrasion resistance. The bead consists essentially of 7% to 40% zirconium oxide, 10% to 32% silica, 10% to 35% sodium oxide, and 10% to 50% calcium oxide by weight.

SUMMARY OF THE INVENTION

It is a particular feature of this invention that glass beads may be made of varying size up to 30 mesh (U.S. Standard) and larger, that have relatively high incipient melting points in the order of about 1800° to 2300° F. and higher. These glass beads with the particular composition of this invention have been found to have a very sharp softening zone or melting point range, such that they start to soften only relatively near the melting point and do not slump gradually at temperatures approaching the melting point, or tend to adhere together or agglomerate, but maintain strength properties at elevated temperatures and are self-sustaining. Such glass beads have utility in varying fields, such as use as catalytic agents, heat transfer material at high temperatures, propping agents for catalytic acid processes, and as heat reservoir media.

Further, as a particularly important point in this invention, the beads, through the use of zirconia, i.e., zirconium oxide, in the final bead composition are highly abrasion resistant, and, as a consequence can be used in various beds that are subjected to shifting or tumbling movement, and the beads in rubbing against one another or confining surfaces do not easily abrade or break down.

Essentially, the glass beads of this invention can be produced from compositions having incipient melting temperatures in the range of 1800° to 2300° F. The beads have a composition of about 7 to 40% zirconium oxide, 10 to 32% silica, 10 to 35% of an alkali oxide, preferably sodium oxide, and 10 to 50% of an alkaline earth oxide, preferably calcium oxide, all by weight. This glass bead composition has a much higher softening point than conventional soda lime glass having a softening temperature point in the range of about 1300° F. or below. Such conventional soda lime glass has 13 to 15% sodium oxide, 12½ to 13½% calcium oxide, and 69 to 72% silica, and does not have the high abrasion resistant qualities of the glass bead of this invention.

The glass bead composition of this invention can be made by conventional processes. The glass beads can be made in any fine size up to relatively large size, such as 30 mesh and above, and in a range of 3 to 10 U.S. Standard series mesh. This large size bead is difficult to produce in vertical stack furnaces, such as that shown in Charles C. Bland U.S. Patent No. 2,600,963, issued June 17, 1952, and assigned to Flex-O-Lite Manufacturing Corporation, but the large glass beads can be made simply and efficiently using the bead blowing process by contacting a stream of the liquid glass with a blast of compressed air and maintaining the dispersed droplets at a high temperature, as illustrated in Bland U.S. Letters Patent Nos. 2,965,921 and 3,150,947.

The manufacture of the glass is accomplished by melting the glass charge or batch in a conventional glass furnace having a generally closed top with openings for escape of gases. The furnace is made of conventional heat resistant refractory. In the production of the melt the heated furnace has added to it in incremental batches the compositions yielding the glass components of this invention. The temperature employed is in the range of about 2500° F. to 2900° F. After sufficient batches have been added to bring the glass melt up to a desired level, the melt is ready for use. The process can be carried out in continuous fashion by dispensing the molten glass through an outlet communicating with the body of the glass melt underneath the liquid level.

After the melt has been prepared, it is ready for production by conventional methods into glass beads. This manufacture can be accomplished by conventional methods, such as disclosed in the Stradley U.S. Patent No. 2,790,723 and Rindone U.S. Patent No. 2,838,408, as well as Bland U.S. Patent No. 3,150,947 and Schott U.S. Patent No. 3,148,045. The molten glass can, as is accomplished according to conventional practice, be poured directly into water where it is rapidly cooled to form frit or cullet. The frit is then dried and ground to the desired size. Particles can then be converted to glass beads in conventional fashion by blowing or dropping the glass particles through a high temperature flame or radiant heating zone, such as shown in the Bland U.S. Patent No. 2,600,963. They may also be prepared as disclosed in Bleaker U.S. Patent No. 1,175,224 or Potters U.S. Patent No. 2,334,678. The aforementioned particles can be spherulized to glass beads in the furnace, and in this process the beads assume spherical shape when passed through the high temperature flame by the action of the surface tension, and the discharge of the beads to air provides rapid cooling when the particles are removed from the high temperature region to harden the spheres without divitrification.

For the production of large diameter glass beads, up to one-eighth inch in size, it has been found desirable to use the process and apparatus set forth in the Bland U.S. Patent No. 2,965,921, granted Dec. 27, 1960. In such process, the glass charge is melted, as previously described, and discharged through the furnace spout, as set forth in the patent, onto a plate from which it is dispersed by a high pressure fluid stream. Where the fritting method is used, the frit ground up into cullet of the desired large particle size, where the larger beads are desired to be employed, may be dropped through a flame employed in a horizontal-type of furnace or other high temperature flame or radiant heating zone. For the large diameter beads, the aforementioned types of processes are desirably employed rather than a vertical furnace where the beads are blown upwardly, as in the Bland U.S. Patent No. 2,600,963, which takes smaller size beads, but does not have sufficient force or enough height in some instances to lift the larger particles through the furnance in their vertical travel through the bottom of the furnace where they are introduced to the top of the furnace where they are discharged.

The above features are objects of this invention and further objects will appear in the detailed description which follows.

The glass beads of this invention are characterized by their incipient melting point of about 1800° F. to 2300° F., or higher, and by their sharp softening range up to liquefaction to the desired fluidity or viscosity for bead blowing. Thus, the range between the point where the beads first begin to lose their mechanical stability up to incipient melting of the compositions to liquid glass is only about 100° to 200° F. This sharp range has been found to be quite advantageous for the previously described high temperature usages of the beads as catalytic agents, propping agents, heat transfer media, and the like, where some degree of movement of the beads is encountered with a high degree of abrasion resistance obtained. After reaching the incipient melting point, the glass composition may be heated an additional 300° to 500° F. to obtain the desired degree of fluidity or viscosity for bead blowing. The sharp softening range is quite desirable in the glass bead product so that a stable self-supporting bead is provided which does not slump when subjected to high environmental temperatures, such as obtained in the employment of the glass beads as heat transfer media, catalytic agents, or the like, in various chemical processes.

In making the glass bead compositions of this invention, the zirconia is preferably employed in the form of zirconium silicate, since in this combined form with silica the zirconia goes into solution much more readily than through the employment of zirconia per se. The zirconia is employed for its properties as an $RO_2$ glass making component, and, particularly, because of its high degree of hardness, high temperature resistance, and abrasion resistance. It has been found that in the final composition, zirconia can be employed in the range of about 7 to 40%. The upper limit of zirconium oxide in the final glass bead composition is restricted since it has been found that too high a proportion causes the formation of scum in the melted composition before the liquid glass formulation is blown into beads. The zirconium silicate or zircon is preferably employed as a milled product, or fine particles, such as would be comparable to fine sand in the size of about 200 to 400 mesh or finer. It is preferable to employ particle sizes in this range of about 90% with the remainder being in the particle size of about 100 to 200 mesh. When so employed, the zircon goes relatively easily into solution when heated to the liquefaction temperature with the remainder of the glass bead formulation.

The silica employed in the glass formulation is in the amount of about 10% to 32% by weight. The reduction of silica over that conventionally employed in soda lime glass, previously described, is believed to aid in the creation and maintenance of a sharp softening range. Conventional soda lime glass, generally employing a higher percentage of silica, is a good deal more viscous than the glass composition of this invention and has a substantially greater and more extensive softening range, which is obviated by the instant composition. The high percent of silica in the conventional soda lime glass causes a softening and viscosity much like taffy over a wide softening range. Further, the ultimate liquid conventional soda lime glass is more viscous than the instant compositions, and does not lend itself to bead blowing production processes, as well as the compositions of this invention.

The alkali oxide employed in the glass bead formulation is preferably sodium oxide used in the amount of about 10% to 35% by weight. The sodium oxide acts as a glass making flux and it will be understood that other alkali metal oxides, such as potassium oxide and lithium oxide may also be employed by substitution either in part or in whole for the sodium oxide. In cases of total substitution, greater difficulty in obtaining solution is encountered however. It has been found that through the use of sodium oxide the components going into the formulation can be put into solution more easily. The upper limit of the sodium oxide, however, is restricted, since it has been found that the softening range of the ultimate glass bead composition is lowered.

The alkaline earth oxide employed is preferably calcium oxide, which is used in the range of about 10% to 50% by weight. It will be understood here also that other alkaline earth oxides may be employed, such as magnesium oxide, strontium oxide, and barium oxide. Zinc oxide, although not an alkaline earth oxide, has also been found to be useful, and the aforementioned oxides, besides calcium oxide, can be employed to replace in part, or may be used in whole for the calcium oxide as glass making fluxing agents. Where complete substitution of calcium oxide is practiced, some difficulty may be encountered in obtaining complete solution of the components in the glass melt. Where a combination of these oxides is employed, melting may be facilitated however, and the alkali metal oxide may be reduced. Also, it will be understood that where the glass making temperatures are increased, the alkali metal oxide may be reduced, or, in some circumstances, eliminated. The temperature employed in melting the formulations described is in the order of about 2500° to 2900° F. to obtain the necessary degree of liquefaction for the bead blowing processes in making the glass beads.

The glass making composition of this invention provides, when melted, a liquid glass of a good workable degree of fluidity. Further, the formulation employed, through the use of zirconium silicate where the zirconia is chemically bound with the silica, has been found to enable the zirconia to go into solution much more easily than when zirconium oxide or zirconia is employed in the uncombined form. The fluidity of the glass is important in the manufacture of glass beads, and the formulations can be very readily employed in making beads according to the bead blowing process fully described in U.S. Patent No. 3,150,947. This type of process is employed in the manufacture of these beads and particularly to make beads of 30 mesh and larger in size. The size of 3 to 10 mesh has been found to be particularly desirable and requires the bead blowing process, since these beads are somewhat heavy for the vertical stack process in Bland U.S. Patent No. 2,600,963. In this process, as fully described in the patent, the glass charge is melted to provide a liquid glass composition which is then dispersed in a stream, such as a free falling stream. The stream is then contacted by a blast of compressed gas, such as air, and the path of the dispersed droplets is maintained at a high temperature, such as by the creation of an enveloping gas flame. The dispersed droplets are maintained at this high temperature and the beads are shaped to a substantially spherical form by surface tension, and after being carried into a relatively cooler space, they are solidified in space and then collected, as is well understood in the art.

It will be understood that to provide the glass bead compositions of this invention, the alkaline earth oxide and alkali metal oxides may be used either as oxides as such or in the form of carbonates or hydroxides or complex alkali metal-silico-halides, since, when melted together in the glass charge composition, they form the ultimate oxides of the glass composition.

There is listed below in Example I a preferred formulation for the glass bead composition of this invention.

Example I

| Component: | Weight percent |
| --- | --- |
| $ZrO_2$ | 33.0 |
| $SiO_2$ | 19.4 |
| $Na_2O$ | 20.0 |
| CaO | 27.6 |

In this preferred formulation the zirconium oxide was employed in the glass melt in the form of zircon, i.e., $ZrSiO_4$, and the sodium oxide in the form of $Na_2O \cdot SiO_2$. It is also possible to supply $Na_2O$ as $Na_2CO_3$ and $SiO_2$ as sand. Likewise, the calcium oxide was employed in a readily available carbonate form, i.e., calcium carbonate $CaCO_3$. The glass batch, after being fired at 2500° F. to 2900° F., was obtained in good solution without formation of scum, and was readily formed into glass beads. The resultant glass beads were quite hard and abrasion resistant, and were self-supporting up to 2100° F.

Example II

| Component: | Weight percent |
|---|---|
| $ZrO_2$ | 29.1 |
| $SiO_2$ | 21.4 |
| $Na_2O$ | 22.1 |
| CaO | 27.4 |

In this Example II the source of the zirconium oxide, the sodium oxide, and the calcium oxide is the same as that listed for Example I above. Additional silica over and above that coming from the zircon and sodium silicate in this and other examples listed below can be provided by adding raw silica in the nature of sand. In Example II a glass bead composition was provided which was quite satisfactory up to 1950° F. above which temperature the glass bead began to soften.

Example III

| Component: | Weight percent |
|---|---|
| $ZrO_2$ | 14.6 |
| $SiO_2$ | 28.5 |
| $Na_2O$ | 29.3 |
| CaO | 27.6 |

This glass bead composition of Example III was rated very good up to 1900° F. above which temperature the glass bead began to soften.

Example IV

| Component: | Weight percent |
|---|---|
| $ZrO_2$ | 40.0 |
| $SiO_2$ | 15.9 |
| $Na_2O$ | 16.5 |
| CaO | 27.6 |

This glass bead composition of Example IV utilizes a high percentage of zirconium oxide, which is found to be about the upper limit. The glass bead formulation in preparing the glass melt was somewhat difficult to get into solution, as there was a tendency to scum. However, after getting the formulation into solution, the ultimate glass composition was rated very good up to 2300° F., above which temperature the glass beads began to soften.

Example V

| Component: | Weight percent |
|---|---|
| $ZrO_2$ | 7.3 |
| $SiO_2$ | 32.0 |
| $Na_2O$ | 33.1 |
| CaO | 27.6 |

This formulation of Example V using a low percent of zirconium oxide of 7.3% by weight, and a high percentage of alkali was rated good up to about 1800° F., and only fair up to 1900° F., due to some softening at this higher temperature.

In the following examples the alkaline earth oxide, i.e., calcium oxide, was varied as to proportions.

Example VI

| Component: | Weight percent |
|---|---|
| $ZrO_2$ | 36.2 |
| $SiO_2$ | 26.5 |
| $Na_2O$ | 27.3 |
| CaO | 10 |

In this formulation of Example VI in preparing the glass melt, as in the succeeding formulations where the calcium oxide content is varied, the zircon is used to supply the zirconium oxide and some of the silica, since, as in the preceding formulations, this is the simplest way to get the zirconium oxide into solution. However, in the instant example, as in the succeeding examples, the sodium oxide is used in the form of soda ash, i.e. $Na_2Co_3$, and the calcium oxide is obtained from limestone, $CaCo_3$. In this example the glass melt was rather viscous at the firing temperatures of 2500° to 2900° F., but glass beads could be prepared of larger size. The glass beads were rated good to 2000° F., above which temperature they began to soften.

Example VII

| Component: | Weight percent |
|---|---|
| $ZrO_2$ | 32.2 |
| $SiO_2$ | 23.5 |
| $Na_2O$ | 24.3 |
| CaO | 20 |

In the formulation of Example VII it was found that the glass melt, although not as viscous as in Example VI above, was still on the viscous side. However, glass beads could be produced and they were rated good to 2000° F. above which temperature they began to soften.

Example VIII

| Component: | Weight percent |
|---|---|
| $ZrO_2$ | 28.1 |
| $SiO_2$ | 20.6 |
| $Na_2O$ | 21.3 |
| CaO | 30 |

In this formulation of Example VIII the glass melt was of reduced viscosity as compared to Examples VI and VII, and glass beads could be blown without difficulty. The glass beads began to soften however at about 2000° F.

Example IX

| Component: | Weight percent |
|---|---|
| $ZrO_2$ | 24.2 |
| $SiO_2$ | 17.6 |
| $Na_2O$ | 18.2 |
| CaO | 40 |

In this formulation of Example IX it was found that the glass melt had a good viscosity suitable for bead blowing. The glass beads prepared were stable up to 2100° F., above which temperature they began to soften. This particular formulation was found to be quite desirable.

Example X

| Component: | Weight percent |
|---|---|
| $ZrO_2$ | 20.1 |
| $SiO_2$ | 14.7 |
| $Na_2O$ | 15.2 |
| CaO | 50 |

In this formulation of Example X it was found that the viscosity increased and that it was somewhat difficult to obtain fusion. However, it was found that glass beads could be satisfactorily blown and that they were stable up to about 2000° F. and were only fair at 2100° F. due to softening.

As a result of Examples VI through X, in which the percent of calcium oxide was varied, it was found that the preferable percent of calcium oxide was in the order of about 20% to 40%, although about 10% to 50% can be employed as a broad range.

It will be understood that various changes and modifications may be made in the composition and method of this invention as will be readily apparent to those skilled in the art. Such changes and modifications are within the scope and teaching of this invention as defined by the claims appended hereto.

What is claimed is:

1. A glass bead characterized by a high melting point, a relatively sharp softening range and a high degree of abrasion resistance, said bead consisting essentially of about 33% zirconium oxide, 19% silica, 20% sodium oxide, and 28% calcium oxide by weight.

2. A glass bead characterized by a high melting point, a relatively sharp softening range and a high degree of abrasion resistance, said bead consisting essentially of about 7 to 40% zirconium oxide, 10 to 32% silica, 10 to 35% of sodium oxide, and 10 to 50% calcium oxide by weight.

3. A glass bead characterized by a high melting point, a relatively sharp softening range and a high degree of abrasion resistance, said bead consisting essentially of about 7 to 40% zirconium oxide, 10 to 32% silica, 10 to 35% of sodium oxide and 10 to 50% calcium oxide by weight, said bead being of a size passing through a 30 mesh screen and being dimensionally stable and self-supporting up to at least about 1900° F.

4. A glass bead characterized by a high melting point, a relatively sharp softening range and a high degree of abrasion resistance, said bead comprising about 33% zirconium oxide, 19% silica, 20% sodium oxide, and 28% calcium oxide by weight, said bead being of a size retained on a 30 mesh screen and being dimensionally stable and self-supporting up to at least about 1900° F.

5. A process for making glass beads characterized by a high melting point, a relatively sharp softening range and a high degree of abrasion resistance which comprises melting a composition providing about 7 to 40% zirconium oxide, 10 to 32% silica, 10 to 35% of sodium oxide and 10 to 50% calcium oxide by weight, contacting a liquid stream of said composition by a blast of compressed gas and dispersing said liquid stream into a path of molten droplets of glass, maintaining a high temperature in said path and substantially cooling said droplets to glass beads in space to allow surface tension to shape the droplets to solidified glass beads and collecting the same.

6. A process for making glass beads characterized by a high melting point, a relatively sharp softening range and a high degree of abrasion resistance which comprises melting a composition providing about 33% zirconium oxide, 19% silica, 20% sodium oxide, and 28% calcium oxide by weight, contacting a liquid stream of said composition by a blast of compressed gas and dispersing said liquid stream into a path of molten droplets of glass, maintaining a high temperature in said path and substantially cooling said droplets to glass beads in space to allow surface tension to shape the droplets to solidified glass beads and collecting the same.

7. A process for making glass beads characterized by a high melting point, a relatively sharp softening range and a high degree of abrasion resistance which comprises melting a composition providing about 7 to 40% zirconium oxide, 10 to 32% silica, 10 to 35% of sodium oxide and 10 to 50% calcium oxide by weight, said zirconium oxide being added in the form of zircon, contacting a liquid stream of said composition by blast of compressed gas and dispersing said liquid stream into a path of molten droplets of glass, maintaining a high temperature in said path and substantially cooling said droplets to glass beads in space to allow surface tension to shape the droplets to solidified glass beads and collecting the same, said beads being at least of a size passing through a 30 mesh screen and being dimensionally stable and self-supporting with non-slumping properties up to at least 1900° F.

References Cited

UNITED STATES PATENTS

| 2,566,134 | 8/1951 | Mockrin et al. | 106—52 |
| 2,965,921 | 12/1960 | Bland. | |
| 3,243,273 | 3/1966 | Bland | 65—142 X |
| 3,306,757 | 2/1967 | Duval D'Adrian | 106—52 X |

TOBIAS E. LEVOW, *Primary Examiner.*

W. R. SATTERFIELD, *Assistant Examiner.*

U.S. Cl. X.R.

106—47; 65—21, 142